Aug. 17, 1937.    R. O. ALLEN    2,090,464

IMPLEMENT RETAINER

Filed Aug. 31, 1936

INVENTOR
Roy O. Allen.
BY
HIS ATTORNEY.

Patented Aug. 17, 1937

2,090,464

UNITED STATES PATENT OFFICE 2,090,464

IMPLEMENT RETAINER

Roy O. Allen, Athens, Pa., assignor to Ingersoll-Rand Company, Jersey City, N. J., a corporation of New Jersey Application August 31, 1936, Serial No. 98,709

2 Claims. (Cl. 121—32)

This invention relates to a retaining device, and more particularly to an implement retainer for pneumatic tools of the hammer type in which the percussive element and the working implement are capable of relative reciprocatory movement.

One object of the invention is to preclude ejection of the working implement from the pneumatic tool, and another object is to prevent free rotary movement of the working implement with respect to the pneumatic tool.

Other objects will be in part obvious and in part pointed out hereinafter.

Figure 1:
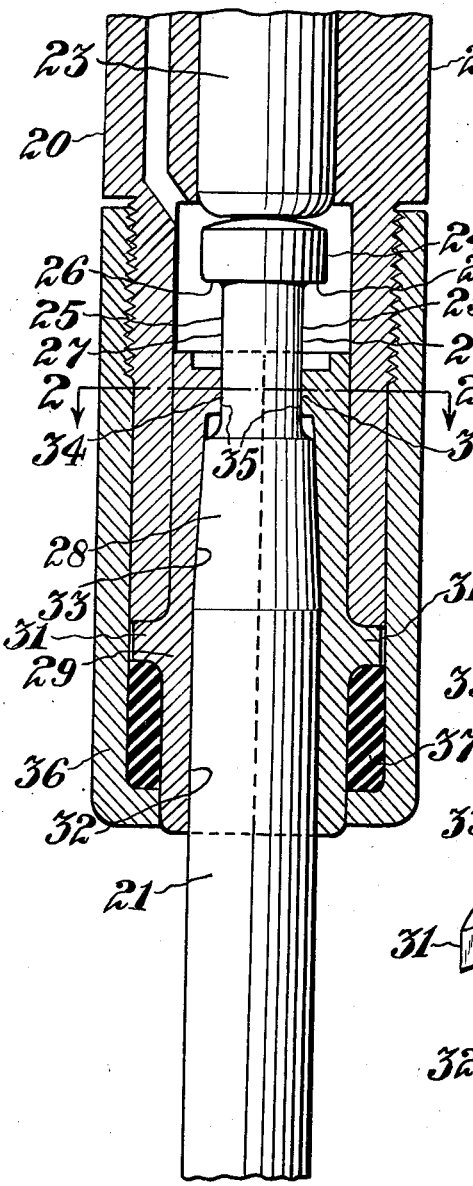
Figure 2:
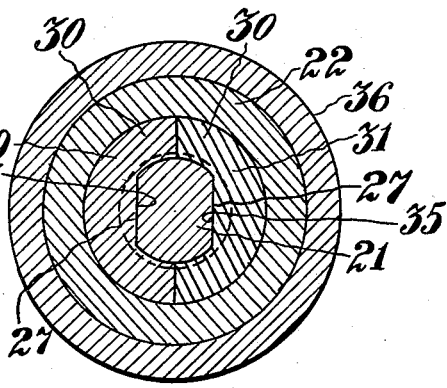
Figure 3:
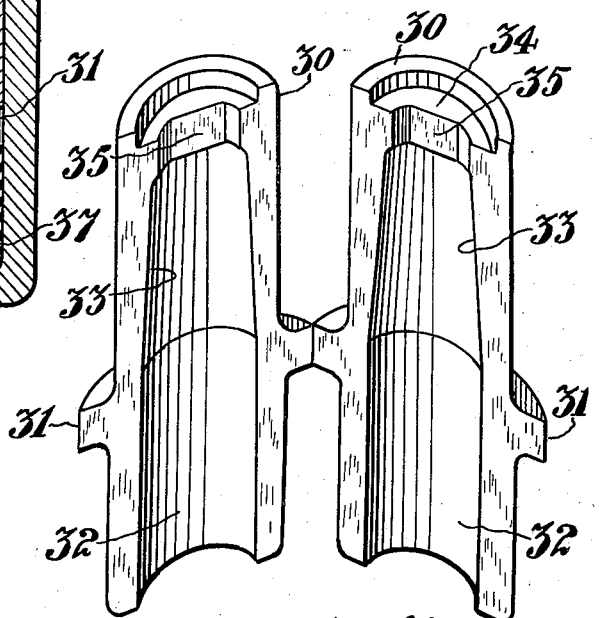

In the accompanying drawing, forming a part of this specification and in which similar reference numerals refer to similar parts, Figure 1 is an elevation, partly in section, of the front end of a pneumatic tool equipped with an implement retainer constructed in accordance with the practice of the invention, Figure 2 is a transverse view taken through Figure 1 on the line 2—2, and Figure 3 is a perspective view of a detail.

Referring more particularly to the drawing, 20 designates, in general, the pneumatic tool and 21 a working implement intended to be actuated thereby. Only the front end of the cylinder 22 of the tool 20 is shown and a front end of a hammer piston 23 to deliver blows of impact against the working implement 21.

The working implement 21 which may, for example, be a rivet cutter is of generally cylindrical shape and on its rearward end is a head 24 against which the piston 23 strikes. Immediately forwardly of the head 24 and in the opposite sides of the working implement are longitudinally extending depressions 25 for the upper ends of which the front end of the head 24 serves as shoulders 26. The bottoms of the depressions 25 are in the form of flat surfaces 27, and a coniform surface 28 is formed on the working implement immediately forwardly of the depressions 25.

The retainer, constructed in accordance with the practice of the invention, comprises a guide member 29 in the cylinder and consisting of a pair of half sections 30 of which the front ends lie exteriorly of the cylinder 22. Intermediate the ends of the sections 29 are external flanges 31 which seat against the front end of the cylinder 22. The guide member is bored to correspond to the conformation of the working implement. The front portion 32 of the bore in the guide member is accordingly of cylindrical shape to accommodate the cylindrical portion of the working implement, and rearwardly of the cylindrical portion 32 is a coniform portion 33 to correspond to the portion 28 of the working implement.

At the rearward end of the portion 33 and integral with the half sections 30 are introverted ribs 34 of which one each is located on a section 29. The ribs 34 extend into the depressions 25 and have flat surfaces 35 to engage the flat surfaces 27 for preventing relative rotary movement between the working implement and the guide member. The ribs 34 also serve as abutments for the shoulders 26 and thus limit the forward movement of the working implement with respect to the cylinder 22.

The ribs are so located on the sections that when the working implement is in the fully retracted position, in which the surface 28 is in body engagement with the surface 33, they will lie near the front ends of the depressions 25 and thus permit of a considerable degree of longitudinal movement of the working implement in a forwardly direction.

The guide member preferably has a slide fit in the cylinder 22 and is retained in the cylinder by a head 36 which is threadedly connected to the cylinder. In the front end of the head is a rubber buffer 37 which seats against the shoulders 31 to press said shoulders against the cylinder and to serve as a cushioning element for absorbing the jars resulting upon impact of the head 24 of the working implement against the ribs 34.

In assembling the retainer on the tool, the sections 29 are first placed in position on the working implement so that the ribs 34 lie in the depressions 25. The parts thus far assembled are placed in the front end of the cylinder. The head 36, with the buffer 37 arranged therein, is then threaded in position on the cylinder to cause slight compression of the rubber buffer. Thus, during the operation of the tool the buffer will, by its frictional contact with the guide member, prevent rotary movement of the guide member within the cylinder, and the flat surfaces 35 of the ribs engaging the surfaces 25 will prevent rotary movement between the working implement and the guide member.

During the operation of the tool the force applied thereto for pressing the working implement to the work tends to maintain the coniform surfaces 28 and 33 in sealing contact with each other. The working implement, of course, reciprocates with respect to the guide member but the loss of pressure fluid through the guide member is negligible for the reason that contact between the surfaces 28 and 33 is broken only momentarily and the pressure applied to the tool by the operator will assure the prompt re-establishment of sealing contact between the surfaces 28 and 33 after the delivery of a blow by the hammer piston against the working implement.

In the event that resistance to the progress of the working implement should suddenly cease, as when a rivet head is severed from the body, and in which case the working implement may be projected sharply forwardly the ribs 34 will engage the shoulders 26 and prevent ejection of the working implement from the tool and the consequent shock will be absorbed by the rubber buffer 37.

I claim:

1. In an implement retainer for pneumatic tools, the combination of a casing and a working implement in the casing having depressions in opposite sides thereof and shoulders at the rear ends of the depressions, a guide bushing in the casing comprising a pair of half sections, an internal rib integral with each half section extending into the depressions to prevent relative rotary movement between the working implement and the guide member and forming abutments for the shoulders to prevent ejection of the working implement from the casing.

2. In an implement retainer for pneumatic tools, the combination of a casing and a working implement in the casing having depressions in opposite sides thereof and shoulders at the rear ends of the depressions, a guide bushing in the casing comprising a pair of half sections, an internal rib integral with each half section extending into the depressions to prevent relative rotary movement between the working implement and the guide member and forming abutments for the shoulders to prevent ejection of the working implement from the casing, there being external shoulders on the half sections, a head detachably secured to the casing, and a rubber buffer in the head acting against the external shoulders and the head to press the external shoulders against the casing and to prevent free rotation of the guide member with respect to the casing.

ROY O. ALLEN.